United States Patent
Jantz et al.

(10) Patent No.: US 11,892,548 B2
(45) Date of Patent: Feb. 6, 2024

(54) TECHNIQUES FOR SECURING LIVE POSITIONING SIGNALS

(71) Applicant: OpenTV, Inc., San Francisco, CA (US)

(72) Inventors: Scott Jantz, Gainesville, FL (US); Nir Livay, Gainesville, FL (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 18/091,566

(22) Filed: Dec. 30, 2022

(65) Prior Publication Data

US 2023/0213660 A1 Jul. 6, 2023

Related U.S. Application Data

(63) Continuation of application No. 17/181,323, filed on Feb. 22, 2021, now Pat. No. 11,567,217, which is a
(Continued)

(51) Int. Cl.
*G01S 19/21* (2010.01)
*G01C 21/00* (2006.01)
(Continued)

(52) U.S. Cl.
CPC ............ *G01S 19/215* (2013.01); *G01C 21/00* (2013.01); *G01S 19/13* (2013.01); *G01S 19/46* (2013.01);
(Continued)

(58) Field of Classification Search
CPC .................................................... G01S 19/215
See application file for complete search history.

(56) References Cited

U.S. PATENT DOCUMENTS 5,621,793 A * 4/1997 Bednarek ................ G01S 19/14
380/258
5,786,773 A * 7/1998 Murphy ................... G01S 19/11
701/16
(Continued)

FOREIGN PATENT DOCUMENTS

CN 102158760 A * 8/2011
CN 102158760 A 8/2011
(Continued)

OTHER PUBLICATIONS

International Search Report and Written Opinion for PCT/US2015/027302 dated Sep. 18, 2015, 10 pages.
(Continued)

*Primary Examiner* — Shelley Chen
(74) *Attorney, Agent, or Firm* — POLSINELLI LLP

(57) ABSTRACT

A pay television satellite broadcast includes validation data that can be used to validate authenticity of live global positioning system (GPS) data. The validation data may be included within entitlement messages and encrypted for security and selective reception by authorized receivers. A navigation system may compute checksums of received live GPS data and compare with the validation data for a match. A decision about whether or not to use the live GPS data may be taken based on whether or not the computed checksums match the validation data received via the pay television satellite broadcast signals.

20 Claims, 5 Drawing Sheets

Related U.S. Application Data continuation of application No. 15/293,964, filed on Oct. 14, 2016, now Pat. No. 10,955,560, which is a continuation of application No. 14/260,162, filed on Apr. 23, 2014, now Pat. No. 9,470,796.

(51) Int. Cl.

| | | |
|---|---|---|
| *G01S 19/13* | (2010.01) | |
| *H04N 21/258* | (2011.01) | |
| *H04N 21/61* | (2011.01) | |
| *G01S 19/46* | (2010.01) | |
| *H04N 21/266* | (2011.01) | |
| *H04N 21/222* | (2011.01) | |
| *H04N 21/438* | (2011.01) | |
| *H04N 21/4623* | (2011.01) | |

(52) U.S. Cl.
CPC . *H04N 21/25816* (2013.01); *H04N 21/26613* (2013.01); *H04N 21/6143* (2013.01); *H04N 21/6193* (2013.01); *H04N 21/222* (2013.01); *H04N 21/26606* (2013.01); *H04N 21/438* (2013.01); *H04N 21/4623* (2013.01)

(56) References Cited

U.S. PATENT DOCUMENTS

| | | | | |
|---|---|---|---|---|
| 6,009,116 | A | | 12/1999 | Bednarek et al. |
| 6,047,258 | A | * | 4/2000 | Allison .................. G06F 21/31 380/258 |
| 6,269,446 | B1 | * | 7/2001 | Schumacher ......... H04L 9/3247 713/181 |
| 6,360,322 | B1 | * | 3/2002 | Grawrock ............... G06F 21/40 713/180 |
| 7,194,620 | B1 | * | 3/2007 | Hayes ..................... H04L 9/321 713/157 |
| 7,274,332 | B1 | * | 9/2007 | Dupray .................. G01S 5/021 342/450 |
| 7,340,283 | B1 | * | 3/2008 | Melick .................... G01S 1/045 342/357.29 |
| 8,224,978 | B2 | * | 7/2012 | Driscoll ................. H04L 63/18 709/224 |
| 8,776,247 | B2 | * | 7/2014 | Peeters .................... G06F 21/52 713/168 |
| 9,052,375 | B2 | * | 6/2015 | Sampigethaya ... H04B 7/18506 |
| 9,094,817 | B2 | * | 7/2015 | Brassil .................. H04W 12/06 |
| 9,470,796 | B2 | | 10/2016 | Jantz et al. |
| 9,736,147 | B1 | * | 8/2017 | Mead ...................... G06F 21/31 |
| 10,955,560 | B2 | | 3/2021 | Jantz et al. |
| 11,567,217 | B2 | | 1/2023 | Jantz et al. |
| 2002/0154777 | A1 | * | 10/2002 | Candelore .............. H04N 5/775 380/258 |
| 2003/0181160 | A1 | * | 9/2003 | Hirsch ............... H04N 21/4524 348/E7.071 |
| 2004/0242150 | A1 | * | 12/2004 | Wright ..................... H04N 7/20 455/12.1 |
| 2005/0096845 | A1 | * | 5/2005 | Bergin .................... G01S 19/23 701/514 |
| 2006/0168654 | A1 | * | 7/2006 | Jennings ................. H04L 63/06 726/11 |
| 2006/0242414 | A1 | * | 10/2006 | Corson ................. H04W 12/06 713/171 |
| 2006/0250302 | A1 | * | 11/2006 | Park ...................... G01S 5/0289 342/357.43 |
| 2007/0217763 | A1 | * | 9/2007 | Siemens ............... G11B 27/032 386/226 |
| 2008/0092181 | A1 | | 4/2008 | Britt |
| 2008/0289033 | A1 | * | 11/2008 | Hamilton .............. H04L 63/107 726/19 |
| 2010/0007551 | A1 | * | 1/2010 | Pagliuco .................. G01C 3/08 701/300 |
| 2010/0134352 | A1 | | 6/2010 | Thomson et al. |
| 2010/0149031 | A1 | | 6/2010 | Dawson et al. |
| 2010/0287038 | A1 | * | 11/2010 | Copejans ................ G01S 19/14 342/357.29 |
| 2010/0287288 | A1 | * | 11/2010 | Driscoll ................ H04W 12/06 709/229 |
| 2010/0303235 | A1 | * | 12/2010 | Damidaux ............. G01S 19/02 380/270 |
| 2011/0057830 | A1 | * | 3/2011 | Sampigethaya ........ G01S 11/08 342/36 |
| 2011/0102259 | A1 | * | 5/2011 | Ledvina ................ G01S 19/215 342/357.59 |
| 2011/0176508 | A1 | * | 7/2011 | Altintas ............... H04W 72/085 370/329 |
| 2011/0203003 | A1 | * | 8/2011 | Peeters ................... G06F 21/52 726/26 |
| 2012/0151223 | A1 | * | 6/2012 | Conde Marques ......................... G06F 21/6218 713/193 |
| 2012/0169462 | A1 | * | 7/2012 | Park ........................ G07C 9/20 340/5.65 |
| 2012/0246735 | A1 | * | 9/2012 | Peeters ................. H04L 63/126 726/26 |
| 2012/0281741 | A1 | * | 11/2012 | Feher ..................... G16H 15/00 375/219 |
| 2013/0328719 | A1 | * | 12/2013 | Gum ..................... G01S 19/215 342/357.73 |
| 2014/0108800 | A1 | * | 4/2014 | Lawrence ............. H04L 63/123 713/168 |

FOREIGN PATENT DOCUMENTS

| | | | | | |
|---|---|---|---|---|---|
| CN | 103413220 | A | * | 11/2013 | |
| EP | 1675298 | A1 | * | 6/2006 | .......... H04L 9/3271 |
| GB | 2462834 | A | * | 2/2010 | |
| GB | 2462834 | A | | 2/2010 | |
| JP | 2006195654 | A | * | 7/2006 | |
| JP | 2006195654 | A | | 7/2006 | |
| WO | WO-9628948 | A1 | * | 9/1996 | .......... H04W 12/126 |
| WO | WO-9635293 | A1 | * | 11/1996 | |
| WO | WO-9635293 | A1 | | 11/1996 | |
| WO | WO-2011002534 | A1 | | 1/2011 | |
| WO | WO-2011002534 | A1 | * | 1/2011 | |
| WO | WO 2014/125206 | A1 | | 8/2014 | |
| WO | WO-2014125206 | A1 | * | 8/2014 | |
| WO | WO-2017184254 | A2 | | 10/2017 | |
| WO | WO-2017184254 | A2 | * | 10/2017 | |

OTHER PUBLICATIONS

Supplementary Partial European Search Report for Application No. EP 15 78 2337 dated Jul. 7, 2017, 13 pages.

International Search Report and Written Opinion issued in Singapore Application No. 11201608629X, dated Sep. 15, 2017, 8 pages.

Non-Final Office Action dated Jan. 2, 2019 for U.S. Appl. No. 15/293,964, 8 pages.

Final Office Action dated Aug. 8, 2019 for U.S. Appl. No. 15/293,964, 8 pages.

Non-Final Office Action dated Dec. 30, 2019 for U.S. Appl. No. 15/293,964, 10 pages.

Notice of Allowance dated Nov. 27, 2020 for U.S. Appl. No. 15/293,964, 9 pages.

Extended European Search Report for Application No. EP 22167230.6 dated Aug. 8, 2022; 14 pages.

Notice of Allowance dated Oct. 4, 2022 for U.S. Appl. No. 17/181,323, 9 pages.

\* cited by examiner

TECHNIQUES FOR SECURING LIVE POSITIONING SIGNALS

CROSS-REFERENCE TO RELATED APPLICATIONS

This application is a continuation of U.S. patent application Ser. No. 17/181,323 filed Feb. 22, 2021, which is a continuation of U.S. patent application Ser. No. 15/293,964 filed Oct. 14, 2016, which is a continuation of U.S. patent application Ser. No. 14/260,162 filed Apr. 23, 2014, all of which are incorporated herein by reference in their entirety for all purpose.

TECHNICAL FIELD

This patent document relates to the fields of satellite communication, and in one aspect, to global positioning system satellite communication.

BACKGROUND

Global Positioning System (GPS) technology can be used for location determination, clock synchronization and navigation of an automobile, an airplane or a ship. GPS receivers can receive GPS signals from multiple GPS satellites and determine their position using information embedded in the GPS signals. Several governments and commercial organizations have deployed satellites that transmit GPS signals for military and commercial use. Position and time bearing signals for commercial use are typically sent unencrypted by the GPS satellites.

SUMMARY

Techniques are disclosed for providing anti-spoofing, or validation, information to a receiver of live satellite positioning signals. Using the validation information, the receiver can verify that the information received from a positioning satellite is not compromised or corrupted.

In one example aspect, a method of providing anti-spoofing positioning data is disclosed. The method includes receiving, at a device, positioning signals originating from multiple broadcast sources, generating validity data for each broadcast source and corresponding positioning signals, encrypting the validity data resulting in encrypted validity data and transmitting the entitlement messages over a television distribution network.

In another example aspect, a system for securing positioning data is disclosed. The system includes a global positioning system (GPS) receiver that receives live GPS data from GPS satellites, a checksum generator that, for each GPS satellite, generates checksums over a predetermined amount of received live GPS data, an encapsulation module that encapsulates the checksums for insertion into encrypted messages such as entitlement management messages (EMMs), and a network interface that provides the encapsulated checksums on an interface with a conditional access server.

In yet another example aspect, a method of operating a navigation system is disclosed. The method includes receiving positioning signals over a first network interface from multiple positioning signal sources, receiving an encrypted reference signal over a second network interface that is different from the first network interface, decrypting the encrypted reference signal using a conditional access module to produce a positioning validation signal, deciding, using the positioning validation signal, whether the received positioning signals are valid, determining, when the positioning signals are decided to be valid, a position of a receiving device that includes the first network interface, and navigating the receiving device based on the valid positioning signals.

These and other aspects and their implementations are described in greater detail in the drawings, the description and the claims.

BRIEF DESCRIPTION OF DRAWINGS

Embodiments described herein are illustrated by way of example and not limitation in the figures of the accompanying drawings, in which like reference numbers indicate similar elements and in which.

DETAILED DESCRIPTION

Figure 1:
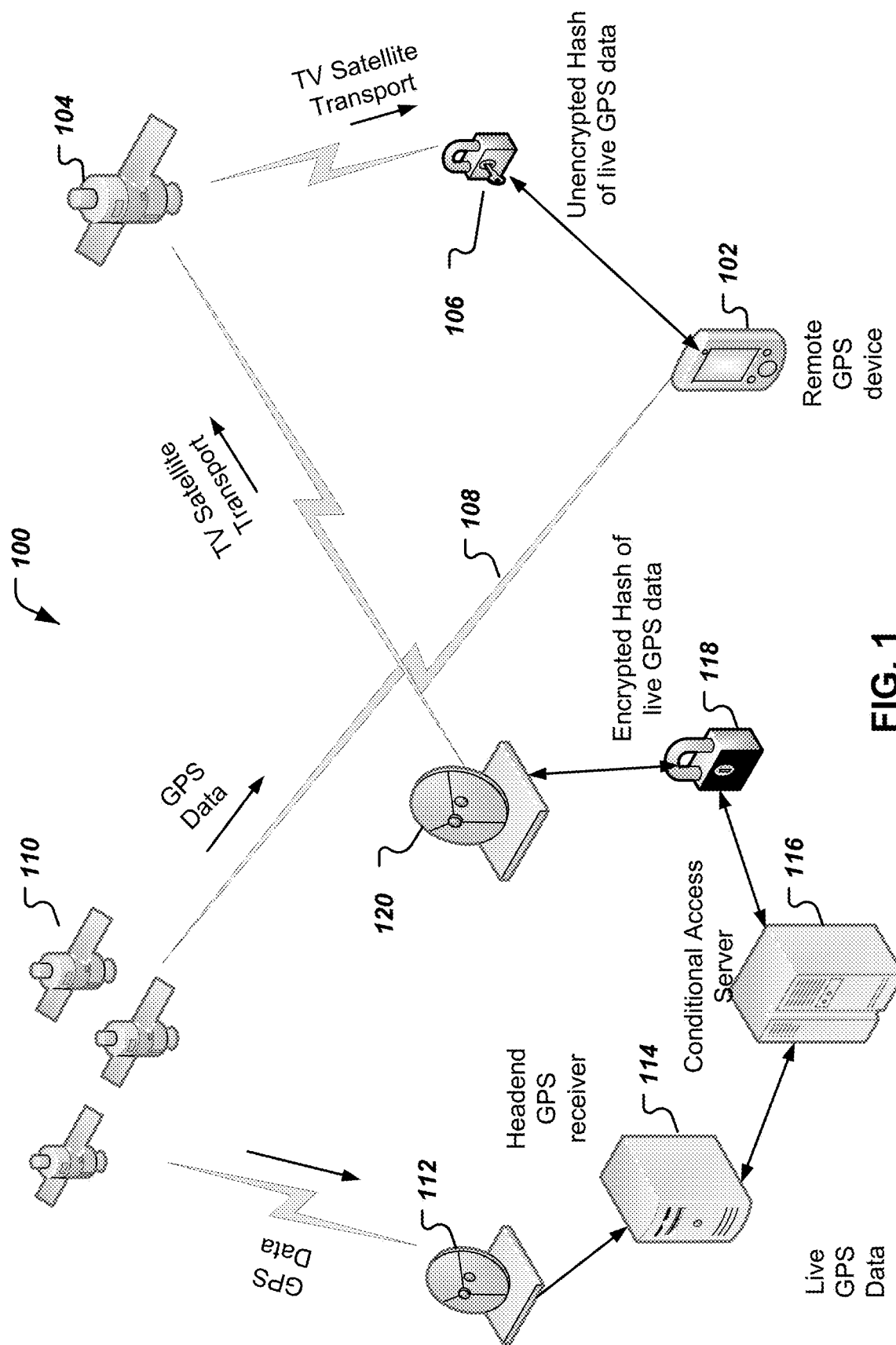
FIG. 1 is an example of a satellite communication network.

Global Positioning System (GPS) technology is incorporated in many consumer and commercial products, including, e.g., phones, navigation receivers, aviation navigation electronics, maritime navigation systems, goods tracking devices, and so on. While several different techniques exist, a typical GPS receiver receives signals from multiple GPS satellites and estimates its position and/or time zone based on the received signals.

In some deployments, a GPS receiver may be incorporated in a navigation system for an auto-pilot operation of a transportation equipment. For example, using the navigation system, a ship or an airplane may be able to navigate itself, without constant human control, based on a travel plan programmed into the navigation system and a periodic determination of its position using signals received by the GPS receiver.

When relying on GPS signals for determining location of the receiving device, reception and/or calculation of incorrect or erroneous positioning data may result in undesirable effects. Without human supervision, these errors may go un-noticed for long time periods. For example, in one undesirable scenario, a ship may receive corrupted or spoofed satellite positioning data and may travel an incorrect route. This may result in expenses such as increased fuel consumption or travel delays. Another undesirable scenario may involve malicious interference with a navigation system's received satellite signals in which fake data is transmitted to the satellite receiver to take control of a ship or an airplane from a remote location.

Data encryption is used in satellite television delivery networks to encrypt high value content such as premium channels or program guide information. When television signals are encrypted for conditional access, only receivers that are authorized to receive a particular program channel can successfully decrypt the encrypted content for presentation to a user. Conditional access technology used for encrypting satellite signals has been known to be robust to accidental or intentional breaches. Further, in some embodiments, the conditional access algorithms (e.g., the encryption scheme used or the key management techniques) can themselves be modified from time to time via renewable security such as removable smartcards. Such renewability may offer additional resistance against ever-improving malicious attacks.

Using the techniques provided in the present document, positioning signal transmissions can be secured by providing information via satellite television broadcast signals that can be used to cross-check or validate veracity of the received positioning data. In some disclosed embodiments, validation information about live ephemeris data and/or other GPS satellite data, possibly including the encrypted military data, is provided through a second, independent communication channel that is different from the communication channel over which the positioning signals are received. For example, secure hashes of live positioning data from available GPS satellites around the Earth may be provided from a digital television broadcast satellite by embedding these hashes within the digital television signals, thereby allowing a receiver to validate the positioning data and ascertain that the received positioning data is indeed coming from the real positioning satellite and not from a rogue device. In some embodiments, the validation data is encoded using an error correction coding, e.g., Reed-Solomon or Low Density Parity Coding, to provide additional robustness against communication errors, In some embodiments, the existing infrastructure of pay-television satellites, which provides an almost identical coverage around the Earth as the positioning satellites, may be used for secure delivery of the anti-spoofing information. These, and other, aspects are described in the present document.

FIG. 1 depicts an example communication network 100 in which a positioning device 102 receives positioning data from positioning signal sources such as GPS satellites 110. The device 102 may be able to determine its position using the received signals and/or perform navigation using the determined position at the current time. The device 102 may also receive a validation signal, e.g., message hash for the received positioning signal from a module 106 that unencrypts validation data or hash of the live GPS signals via a television distribution network from a digital television broadcast satellite 104.

The validation data may be generated and provided to the digital television broadcast satellite 104 as follows. A satellite antenna (network interface) 112 may receive live GPS data from the GPS satellites 110. The live GPS data may be encapsulated be recovered by a GPS receiver 114 and transferred to a conditional access server (CAS) 116. The CAS 116 may perform authorization/deauthorization of subscribers of the television distribution network. The CAS 116 may control subscriber entitlements using encrypted messages such as entitlement management messages (EMMs) and entitlement control messages (ECMs). Both EMMs and ECMs are associated with managing and providing user entitlement or rights on whether a receiver or customer is authorized for accessing a program or service. The CAS 116 may further include the hashes of the live GPS data in the encrypted entitlement messages, e.g., EMMs, with encryption being performed by the encrypter 118. The encrypted messages may be uplinked to the digital television broadcast satellite 104 by an uplink antenna 120.

Figure 2:
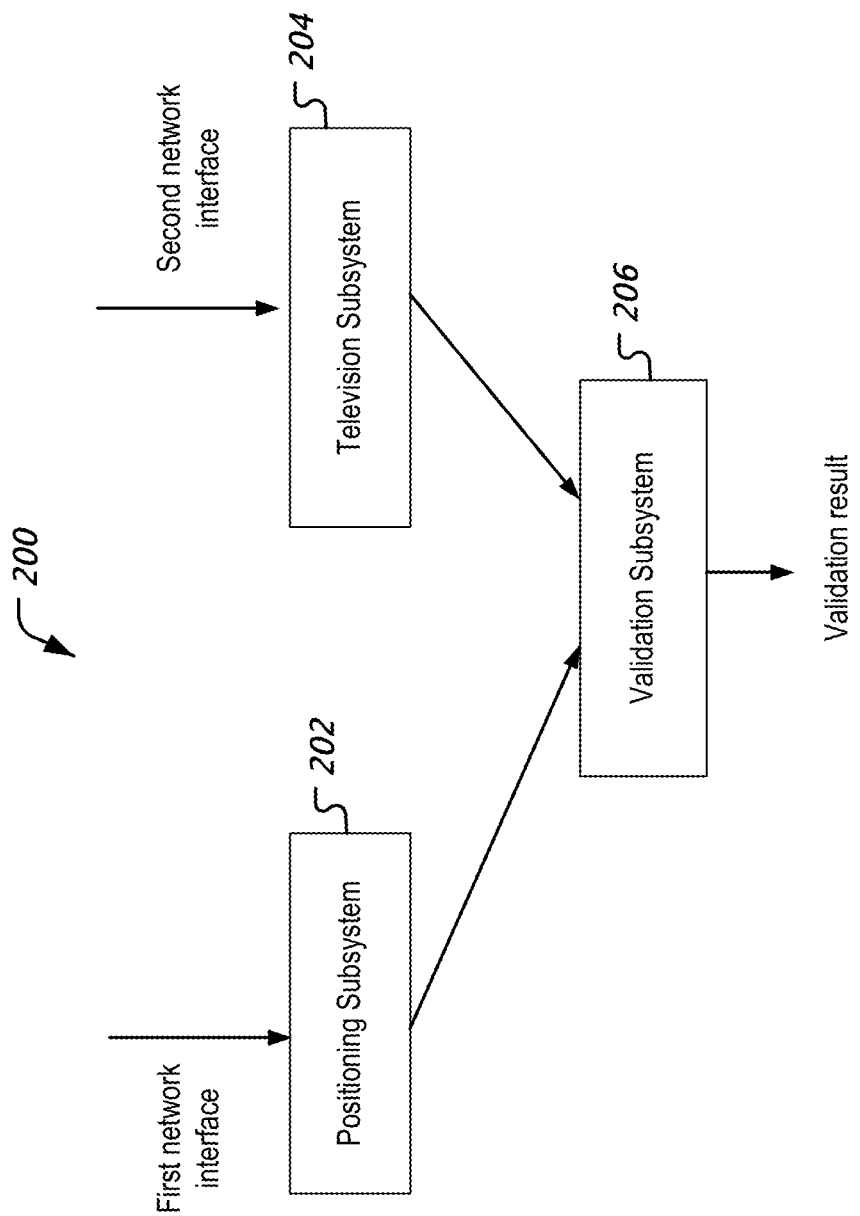
FIG. 2 is a block diagram of an example of a validity-assisted global positioning system.

FIG. 2 is a block diagram depiction of an example of a combined GPS and validation data reception system 200. The system 200 includes a positioning subsystem 202, a television subsystem 204 and a validation subsystem 206. The system 200 may be deployed in a transportation equipment such as a ship, an airplane, a truck or a car. The positioning subsystem 202 receives live GPS signals over a first network interface (e.g., GPS satellites, digital terrestrial transmissions, etc.). The television subsystem 204 receives television programming over a second network interface (e.g., from a digital television broadcast satellite or digital terrestrial television signals). The received television signals include entitlement messages that are encrypted using the conditional access encryption scheme used in the digital television network for securing television programming and other content.

The television subsystem 204 may extract validation data related to the live GPS data from the received entitlement messages by decrypting and parsing the entitlement messages. The validation data may be passed to the validation subsystem 206. The positioning subsystem 202 may provide live positioning data (or a portion thereof) received via the first network interface to the validation subsystem 206. The validation subsystem 206 may perform a cross-check that the live positioning data, as received by the positioning subsystem 202, is identical to the positioning data that originated from the GPS satellites, as indicated by the hash values received via the television subsystem 204.

The validation subsystem 206 may provide results of its validation of live positioning data. The results may be displayed to a user, e.g., via an operator's user interface. Alternatively or additionally, the validation subsystem 206 may raise an alert when there is a mismatch between the live positioning data and the corresponding checksums or hash values received from the digital television network.

In some embodiments, positioning signal sources may include GPS satellites. Each GPS satellite may continuously broadcasts a navigation message. A typical information transmission rate may be about 50 bits per second. The positioning message may be organizes as 37,500 bit messages, that are divided into 25 equal sized frames (1500 bits each), which are further divided into 5 subframes per frame (300 bit each). Each subframe may thus take 6 seconds transmission time. In some embodiments, the transmitted signal may be error protected using, e.g., code division multiple access (CDMA) technology.

In some embodiments, positioning messages may include information as follows. The first subframe of each frame may carry the week number and the time within the week. The second and the third subframes contain information about the precise orbit for the satellite (called ephemeris information). The fourth and fifth subframes may include coarse orbit and status information as well as data related to error correction of the message.

Taking some current GPS satellite deployments as an example, a network of about 12 GPS satellites can provide GPS signals to all areas around the Earth. With each satellite transmitting its GPS signals at around 50 bits/second rate, this means that the validation signals should provide hashing information for about 600 bits of information per second. In some embodiments, this information rate may not pose a significant bandwidth overhead to the downlink capacity of a digital satellite broadcasting network and the positioning information from all satellites may be repeated in the downlink signals of television satellite transmissions. The GPS signals may be secured by encrypting using, e.g., encryption techniques that are used for encrypting entitlement messages transmitted in the downlink. The use of same encryption advantageously allows the inclusion of positioning validation signal without having to provide additional decryption functionality at a receiver of the satellite signals. In some embodiments, a hash function that provides data compression (e.g., by a factor of 2) may be used to reduce the data bandwidth used by the positioning validation signals. For example, a one-way hash function may be used to reduce the data bandwidth from 600 bits/s to 300 bits/seconds. In some embodiments, different amount of hashing/compression may be used to different parts of GPS message fields, e.g., timing information, satellite identity, coarse position data, and so on.

Figure 3:
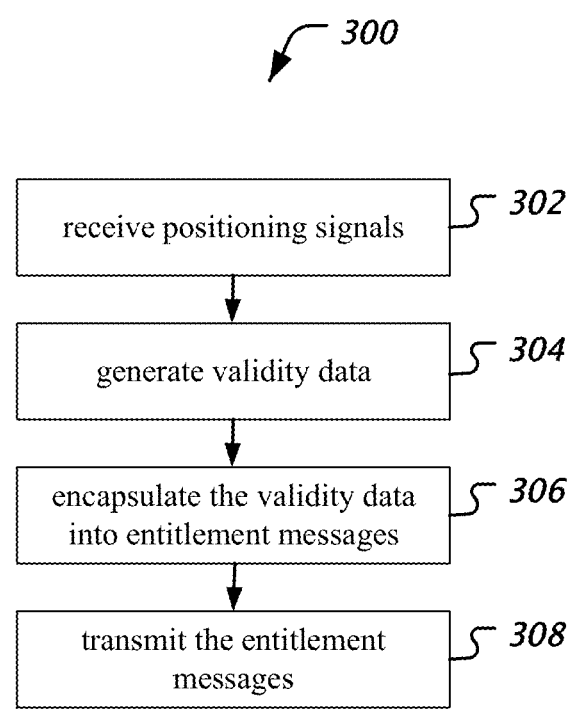
FIG. 3 is a flowchart representation of an example method of providing validation data for positioning signals.
Figure 4:
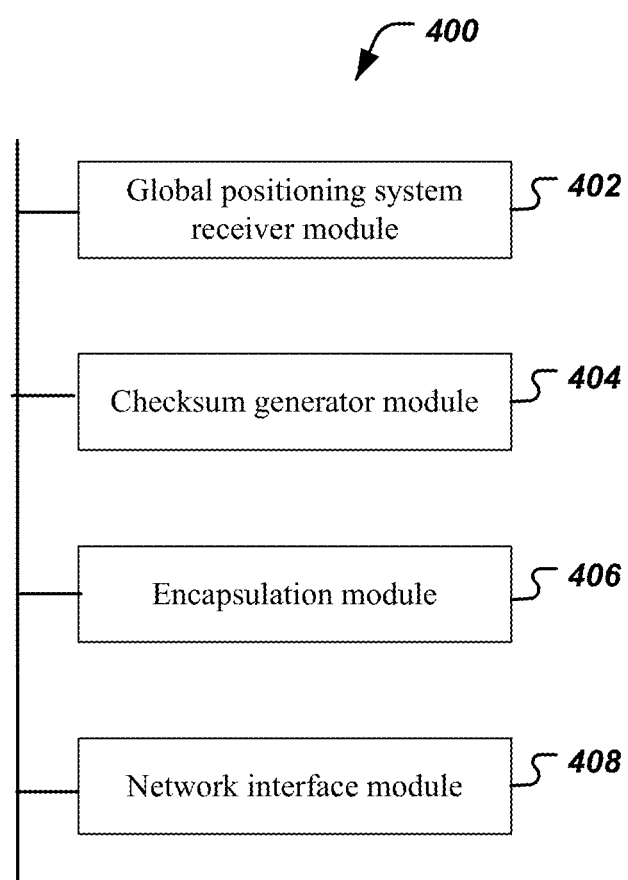
FIG. 4 is a block diagram representation of an example system for securing positioning data.
Figure 5:
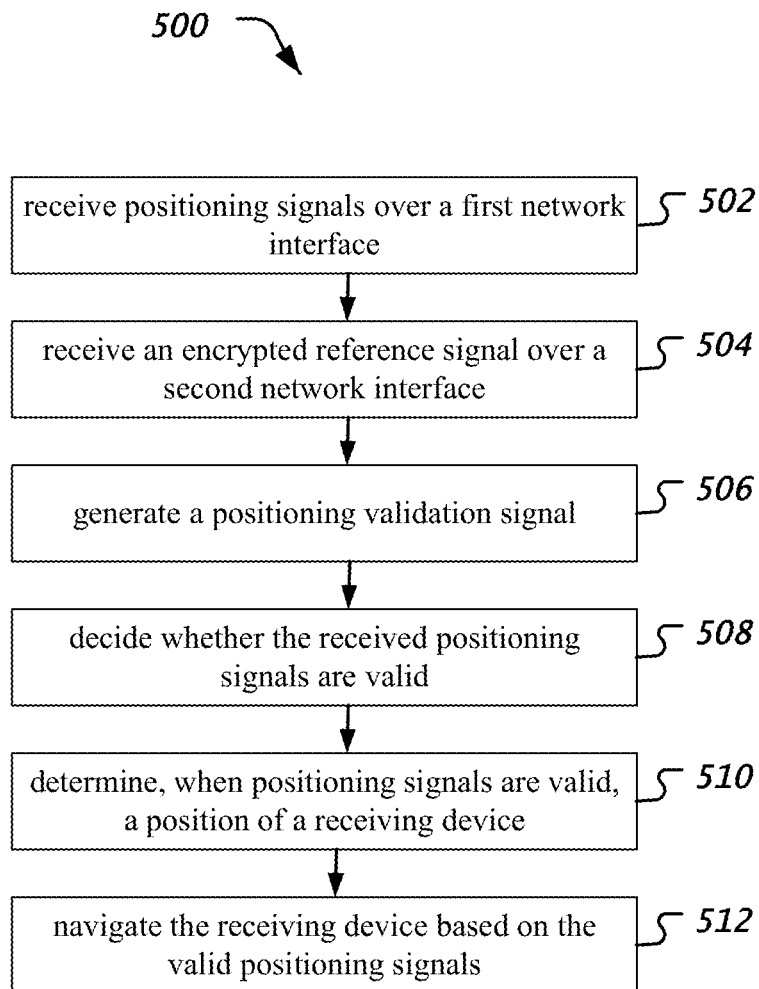
FIG. 5 is a flowchart representation of an example method of operating a navigation system.

FIG. 3 is a flowchart representation of an example method 300 for providing anti-spoofing positioning data in a television distribution network. The method 300 may be implemented using hardware/software controlled by, e.g., a service provider who provided the anti-spoofing service or by a broadcast satellite television network operator.

At 302, a device, e.g., a GPS receiver module in a server, receives positioning signals from multiple broadcast resources. In some embodiments, the multiple broadcast sources may be global positioning system (GPS) satellites. In some embodiments, the multiple broadcast sources may include digital terrestrial television broadcasting transmitters.

At 304, the method 300 generates validity data for each broadcast source and the corresponding positioning signal. The validity data may include data validating each broadcast source's identity (e.g., a unique global identifier, a medium access control address, etc.) and data for authenticating each of the positioning signals. In some embodiments, the validity data may be generated by computing a hash of at least a portion of a positioning message included in the positioning signal. The hash may be based on a hashing function that provides a substantially unique mapping between the portion of the positioning message and the computed hash.

In some embodiments, the validity data is generated by generating a first portion of the validity data to validate an identity of a broadcast source and a second portion of the validity data to validate the corresponding positioning signal of the broadcast source. In some embodiments, the first portion of the validity data and the second portion of the validity data are transmitted at different rates. For example, some live data (e.g., precise satellite orbit data or ephemeris data) may be transmitted more frequently compared to some other live data (e.g., coarse satellite orbit data). As another example, the timing information embedded in the positioning signals, which in turn is included in validity data, may be transmitted more frequently, compared to the satellite orbit position information (coarse or fine positioning information) that is typically transmitted by GPS satellites. In some embodiments, the timing signal is used to generate a third portion of validity data.

At 306, the method 300 encapsulates the validity data into a television system message. In a typical television system, several messages are sent in the downlink direction. Examples of these messages include program table information, e.g., as specified by the Moving Pictures Expert Group (MPEG) standard or the Digital Video Broadcasting (DVB) standard. In some embodiments, the encapsulated validity signals may be sent using table header and structure of an entitlement message in the television system. In some embodiments, a user defined table format may be used for downlink transmission of the validity signals. The entitlement messages may be, e.g., entitlement management messages (EMMs) transmitted in a satellite television distribution network and may include information pertaining to authorization/deauthorization of individual subscribing receivers to be able to decrypt certain transmitted content for viewing. The encapsulation of the validity data within EMMs may be based on run-time factors such as the bandwidth availability.

At 308, the method 300 transmits the entitlement messages over a television distribution network. In some embodiments, the television distribution network may be, e.g., a satellite television distribution network. The entitlement messages may be sent over the satellite downlink, e.g., targeted at receivers of the television programming. In some embodiments, the EMMs may be first generated at equipment in an uplink facility for the television distribution network and uplinked (uploaded) to the satellite via a transmission to the satellite.

In some embodiments, a system 400 for securing positioning data includes a global positioning system (GPS) receiver (402) a checksum generator (404), an encapsulation module (406) and a network interface 408.

The GPS receiver 402 receives live GPS data from GPS satellites. In some embodiments, the GPS receiver 402 may receive data from three GPS satellites and use triangulation to figure out its own position.

The checksum generator 404, for each GPS satellite, generates checksums over a predetermined amount of received live GPS data. For example, in various embodiments, checksum may be generated over a GPS message frame, a GPS message subframe, or different checksums may be generated for header/payload fields of GPS messages.

The encapsulation module 406 encapsulates the checksums for insertion into encryption packets such as EMMs. In one advantageous aspect, EMMs can be targeted at individual receivers (e.g., by encrypting using a key that only a given receiver is able to decrypt with). Thus, carriage of checksum in EMMs can thus "automatically" benefit from the security provided by a conditional access system to entitlement messages carried in a digital satellite television broadcast network. Further, by encapsulating the checksum into EMMs, legacy satellite television receivers (e.g., set-top boxes) can be updated by simply downloading new code for parsing the EMMs. Alternatively, legacy satellite set-top boxes can be updated to include GPS validation technology by providing new smartcards that include a processor/software that performs EMM parsing and validation as described in the present document.

The network interface 408 provides the encapsulated checksums on an interface with a conditional access server. The network interface 408 may be, e.g., an Internet connection (e.g., wired or wireless Ethernet). Messages transmitted over the network interface 408 may be encrypted for security reasons.

In some embodiments, the system 400 further includes an uplink module that receives encapsulated checksums from the conditional access server and uplinks the encapsulated checksums to a satellite for transmissions as EMMs. In some embodiments, the satellite transmits the EMMs on a satellite-to-receivers-on-earth downlink channel ("on earth" means on ground, or in a ship or airplane during transit).

In some embodiments, the checksum generator computes the checksum using a hashing function. As previously discussed, in some embodiments, the hashing function may be selected that the resulting checksum reduces the number of bits compared to the predetermined amount of received live GPS data. For example, in some embodiments, a GPS signal may comprise 1500 bit frames and a hash function that maps the 1500 bits to 128 or 256 bit hash may be used. In some embodiments, an entire positioning message may include 25 frames, and a hash may be calculated on the entire message (i.e., on 37,500 bits). A hash result of 1,024 or 4,096 bits may be used, resulting in a factor of 10 to 30 reduction in the amount of data to be carried as validity data.

FIG. 500 is a flowchart depiction of an example method 500 of operating a navigation system. In some embodiments, the method 500 may be implemented at a navigation system that is "on earth." In some embodiments, the method 500 may be implemented at a digital television receiver (e.g., a satellite or digital terrestrial set-top box). In some embodiments, the digital television receiver may be modified to interface with a navigation system.

At 502, the method 500 receives positioning signals over a first network interface from multiple positioning signal sources. In some embodiments, the positioning signals include a timing signal. Using the timing signals, the method 500 may also determine a wall clock time (time of day) at the geographic location of the receiving device at which the method 500 is being executed.

As previously described, in some embodiments, the multiple positioning signal sources may include the global satellite network, e.g., of GPS satellites, that provides coverage at all places on Earth where satellite signals can be received.

At 504, the method 500 receives an encrypted reference signal over a second network interface that is different from the first network interface. In some embodiments, the encrypted reference signal may be encapsulated within an EMM carried over the digital television distribution network, and thus may benefit from encryption of the EMM using conditional access technology used in the digital television distribution network.

At 506, the method 500 decrypts the encrypted reference signal using a conditional access module to produce a positioning validation signal. In some embodiments, the conditional access module may include a removable smart card. In some embodiments, the conditional access module may be a hardware/software module that may be attached (e.g., soldered on a printed circuit board or included in a silicon die that performs other functions) of the received device.

At 508, the method 500 determines, using the positioning validation signal, whether the received positioning signals are valid. In some embodiments the validity is determined by computing a first checksum from the received positioning signals, and comparing the first checksum with the positioning validation signal for a match between them.

At 510, the method 500 utilizes, when the positioning signals are determined to be valid, the positioning signals to determine a position of a receiving device.

At 512, the method 500 facilitates navigation of the receiving device based on the valid positioning signals. In some embodiments, the method 500 may provide the validation signal over a secure interface between the pay television and the positioning subsystems. For example, in some embodiments, a human "transcriber" may be used to enter current GPS coordinates received from the positioning subsystem into a validation interface (e.g., a user interface displayed by a set-top box). In return, the method 500 may compare the GPS coordinates with the validation signal to check whether the hash of the entered GPS coordinates matches the hash values received in the position validation signal. When the hashes match, an indication may be provided to the user that there is a match and the received GPS coordinates can be trusted. Alternatively or additionally, when the hashes do not match, an alert may be raised for the user to take an action.

In some embodiments, the validation may be performed automatically, i.e., without user intervention. For example, in some embodiments, both the positioning subsystem and the pay television subsystem may provide their respective positioning signals to a validation module. The validation module may verify, based on the hash function, whether the two inputs match. The validation may be performed continuously or upon a per-determined schedule or upon user command to validate GPS signals.

In some embodiments, an apparatus for performing secure navigation includes a module that receives positioning signals over a first network interface from multiple positioning signal sources; a module that receives an encrypted reference signal over a second network interface that is different from the first network interface, a module that decrypts the encrypted reference signal using a conditional access module to produce a positioning validation signal, a module that decides, using the positioning validation signal, whether the received positioning signals are valid, a module that determines, when the positioning signals are decided to be valid, a position of a receiving device that includes the first network interface; and a module that facilitates navigation of the receiving device based on the valid positioning signals.

In some embodiments, a method of operating a navigation system includes receiving a global positioning system (GPS) signal and detecting whether the GPS signal is trustable. The method may be implemented at a computer or a device that navigates a transportation equipment such as a ship, an airplane or a land-based vehicle. Upon determination of the trustability of the GPS signal, navigation may be performed using the GPS signal. In some embodiments, one or more of previously described techniques of checksum verification and/or the use of error correction codes may be used for the determination of trustability of the GPS signal. When the GPS signal is detected to be untrustable, navigation may be performed using an alternate method of navigation. The received GPS signal may be deemed trustable when a hash of the received GPS signal matches a hash value received from another, independent source.

In some embodiments, alternate navigation systems may include using positioning signals such as from a different positioning signal source (e.g., signals from the European Galileo system instead of the U.S. GPS signals). In some embodiments, the alternate navigation system may include human intervention and navigation using other positioning methods such as magnetic field orientation or other radio frequency transmissions to assist the location of a receiver (e.g., cellular or terrestrial digital broadcasting).

In some embodiments, the detecting includes receiving an encrypted reference signal, e.g., described in this document with respect to the use of EMMs in a television distribution system. The encrypted reference signal may be received over the television distribution network and may include a validation signal or information that can be used to cross-check trustability of the GPS signal. For example, the validation signal may include a checksum, as previously described, or may use error correction coding, e.g., Reed Solomon error correction coding or Low Density Parity Codes or another error correction code. In some embodiments, the second network connection may consist of a broadcast satellite television delivery network. As described in the present document, in such a network, a secure downlink mechanism, e.g., an entitlement message, may be used for carrying the encrypted reference signals to the receivers.

In some embodiments, the television distribution network may be used as follows. A secure communication channel may be allocated by the television distribution network (e.g., a satellite channel) to deliver full data from all satellites that comprise a GPS system. Satellite television transmission is often performed using satellites comprising 24 to 56 transponders, with each transponder comprising around 27 MHz bandwidth that typically carries around 40 Mbps of television signal data. The totality of GPS signal transmissions may be in the range of 1 to 12 Mbps and thus a small fraction of the entire bandwidth available to a satellite. A satellite television broadcast system may thus be modified to include, on one or more transponders, GPS validation data (which could be a duplication of live GPS data carried by the GPS satellites). In one beneficial aspect, this would allow a strong anti-spoofing cross-check and also could be used to improve the time to lock and the accuracy of a GPS signal. In some embodiments, the secure channel could also contain differential GPS reference points to recover the full accuracy of GPS anywhere in the world.

It will be appreciated that a server communicating with all live GPS satellites around the world can be used to hash the live data that can then be delivered to GPS devices using a secure channel. For example the secure channel could be a conditional access channel encrypted using a pay-television encryption technology and the GPS device could be running a conditional access technique, such as Nagra's conditional access solution, with the hash delivered inside an EMM.

The disclosed and other embodiments, modules and the functional operations described in this document (e.g., a content network interface, a look-up table, a fingerprint processor, a bundle manager, a profile manager, a content recognition module, a display controller, a user interaction module, a feedback module, a playback indication module, a program guide module, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is disclosed and illustrated, including:

1. A method for validating positioning signals, the method comprising:

receiving one or more positioning signals, the one or more positioning signals being a subset of positioning signals broadcast by a cellular network;

receiving at least one reference signal over a second network that is different from the cellular network, the at least one reference signal including at least a signature representing the positioning signals broadcast by the cellular network;

producing a validation signal based on the at least one reference signal;

determining, based on the validation signal, that the one or more positioning signals received over the cellular network are valid; and controlling a vehicle or device based on the one or more positioning signals.

2. The method of claim 1, further comprising:
determining, based on the one or more positioning signals being valid, a position of a device.

3. The method of claim 1, further comprising:
providing navigation signals to a movable object based on the one or more positioning signals received over the cellular network being valid.

4. The method of claim 1, wherein the one or more positioning signals include a timing signal, and wherein the method further comprises:
determining a time of day based on the timing signal.

5. The method of claim 1, further comprising:
computing a checksum from the one or more positioning signals received over the cellular network; and
determining that the checksum corresponds to the validation signal.

6. The method of claim 1, further comprising:
receiving the at least one reference signal in an entitlement management message over the second network.

7. The method of claim 1, wherein the at least one reference signal is encrypted, the method further comprising:
decrypting the at least one reference signal using a secure processor.

8. A system comprising:
a first network interface configured to receive one or more positioning signals, the one or more positioning signals being a subset of positioning signals broadcast by a cellular network;
a second network interface configured to receive at least one reference signal over a second network that is different from the cellular network, the at least one reference signal including at least a signature representing the positioning signals broadcast by the cellular network; and
a reception system connected to the first network interface and the second network interface, the reception system being configured to:
produce a validation signal based on the at least one reference signal;
determine, based on the validation signal, that the one or more positioning signals received over the first network interface are valid; and
cause control of a vehicle or device based on the one or more positioning signals.

9. The system of claim 8, wherein the reception system is further configured to:
determine, based on the one or more positioning signals being valid, a position of a device.

10. The system of claim 8, wherein the reception system is further configured to:
provide navigation signals to a movable object based on the one or more positioning signals received over the first network interface being valid.

11. The system of claim 8, wherein the reception system is further configured to:
determine a time of day based on a timing signal included in the one or more positioning signals received over the first network interface.

12. The system of claim 8, wherein the reception system is further configured to:
compute a checksum from the one or more positioning signals received over the first network interface; and
determine whether the checksum matches the validation signal.

13. The system of claim 8, wherein the at least one reference signal is received in an entitlement management message over the second network interface.

14. The system of claim 8, wherein the at least one reference signal is encrypted, and wherein the at least one reference signal is decrypted using a secure processor.

15. The system of claim 8, wherein the second network interface is configured to receive broadcast satellite television network signals.

16. A device comprising:
a processor; and
a memory connected to the processor;
wherein the memory stores instructions that, when executed by the processor, cause the processor to:
input one or more positioning signals, the one or more positioning signals being a subset of positioning signals broadcast by a cellular network;
produce a validation signal based on at least one reference signal received over a second network different from the cellular network, the at least one reference signal including at least a signature representing the one or more positioning signals broadcast by the cellular network;
receive a determination, based on the validation signal, that the one or more positioning signals broadcast by the cellular network are valid; and
control a vehicle or device based on the one or more positioning signals.

17. The device of claim 16, wherein the instructions, that when executed by the processor, further cause the processor to:
determine, based on the one or more positioning signals being valid, a position of a device.

18. The device of claim 16, wherein the instructions, that when executed by the processor, further cause the processor to:
provide navigation signals to a movable object based on the one or more positioning signals received over the cellular network being valid.

19. The device of claim 16, wherein the one or more positioning signals include a timing signal, and wherein the instructions, that when executed by the processor, further cause the processor to:
determine a time of day based on the timing signal.

20. The device of claim 16, wherein the instructions, that when executed by the processor, further cause the processor to:
compute a checksum from the one or more positioning signals received over the cellular network; and
determine whether the checksum matches the validation signal.

* * * * *